May 30, 1961 W. H. RANDALL ET AL 2,986,490
METHOD OF MAKING MOLDED PULP ARTICLES
Original Filed Oct. 15, 1951
5 Sheets-Sheet 1

INVENTORS:
WALTER H. RANDALL
& RICHARD L. EMERY
BY
Connolly and Hutz
ATTORNEYS

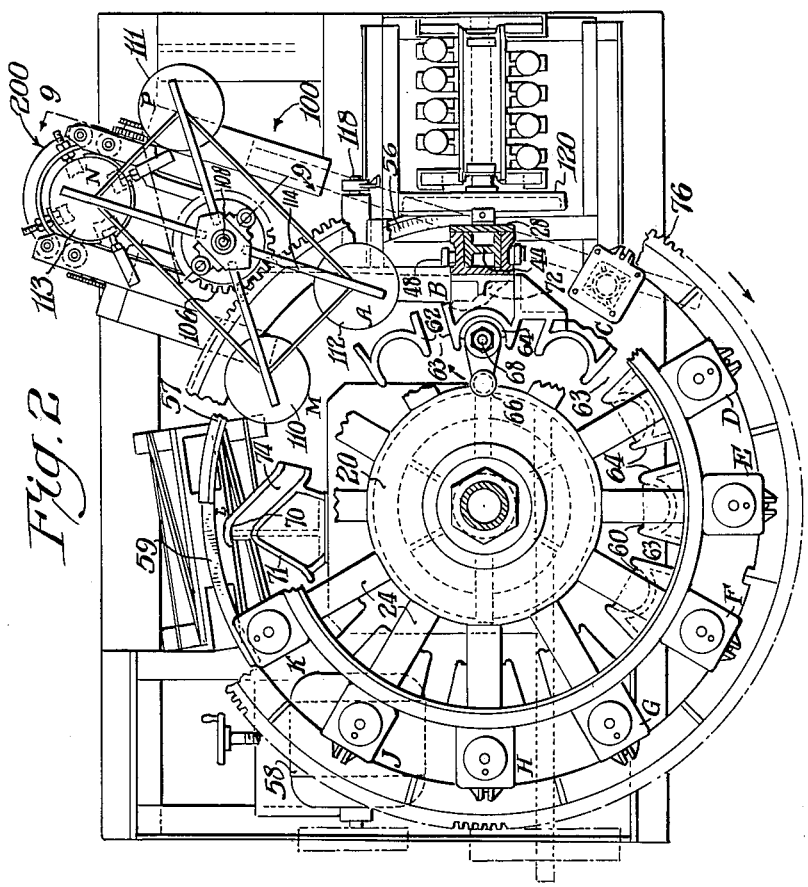

May 30, 1961 W. H. RANDALL ET AL 2,986,490
METHOD OF MAKING MOLDED PULP ARTICLES
Original Filed Oct. 15, 1951 5 Sheets-Sheet 3
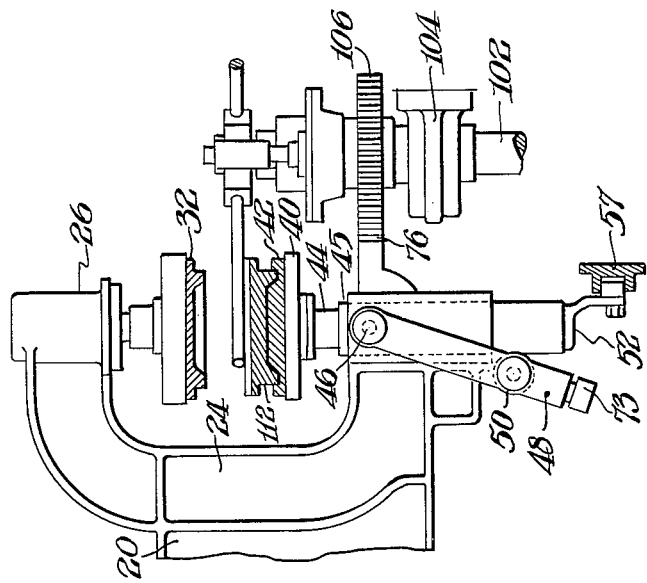
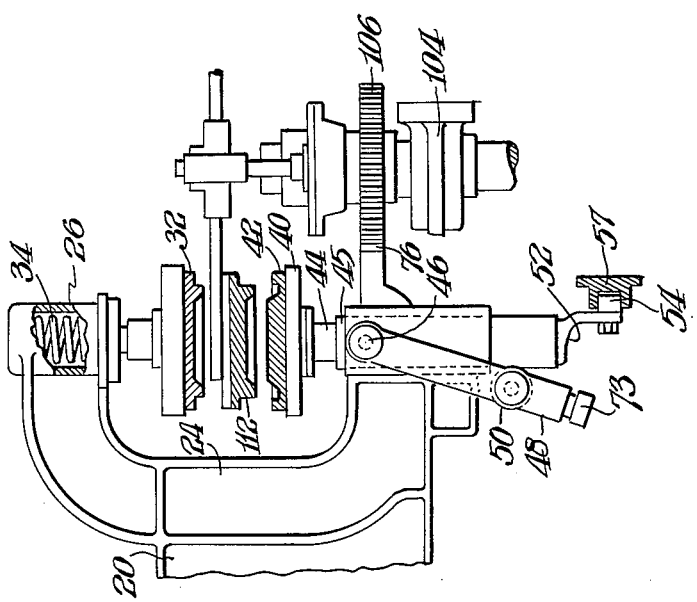
INVENTORS:
WALTER H. RANDALL
& RICHARD L. EMERY
BY
Connolly and Hutz
ATTORNEYS

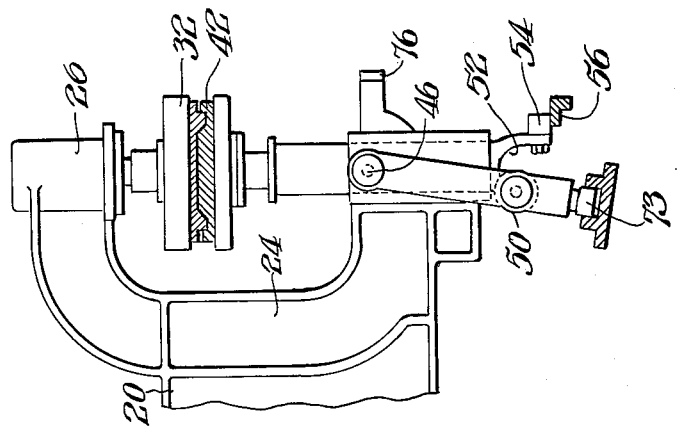
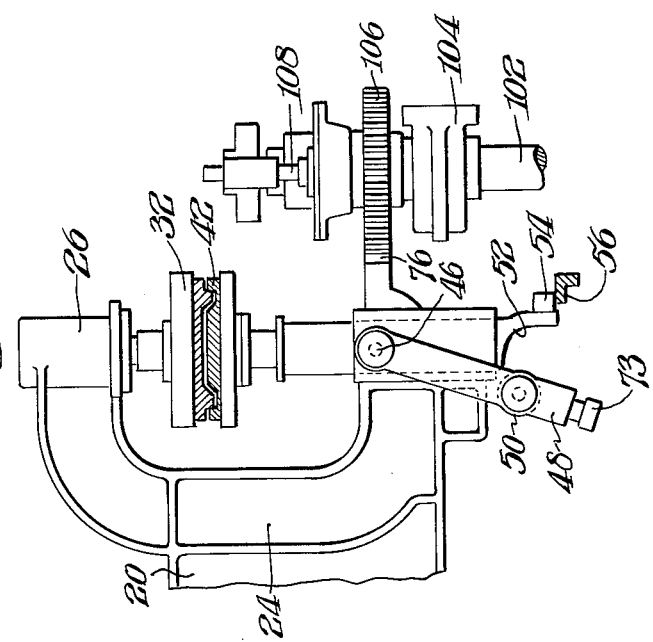

May 30, 1961 W. H. RANDALL ET AL 2,986,490
METHOD OF MAKING MOLDED PULP ARTICLES
Original Filed Oct. 15, 1951 5 Sheets-Sheet 5

INVENTORS:
WALTER H. RANDALL
& RICHARD L. EMERY
BY Connolly and Hutz
ATTORNEYS

United States Patent Office 2,986,490
Patented May 30, 1961

---

2,986,490

METHOD OF MAKING MOLDED PULP ARTICLES

Walter H. Randall and Richard L. Emery, Waterville, Maine, assignors to Keyes Fibre Company, Portland, Maine, a corporation of Maine Original application Oct. 15, 1951, Ser. No. 251,411, now Patent No. 2,752,830, dated July 3, 1956. Divided and this application Oct. 7, 1955, Ser. No. 539,097

6 Claims. (Cl. 162—222)

This invention relates to the pressing and finishing of molded pulp articles after they have been formed to substantially the desired shape.

When molded pulp articles are formed they contain a relatively large amount of water which must be removed. In the past this water has been removed by subjecting the wet articles to several types of drying operations. In one of these, the freshly molded wet article is pressed between heated dies corresponding in shape to those with which the articles are formed. This calls for the use of a relatively large number of expensive dies. Many types of articles, and particularly those whose dimensions or shapes are not critical, can be dried without the use of accurately shaped heating dies, as for example by merely passing them in freely supported condition on a conveyor belt through a steam heated drying tunnel. This so called free-drying technique is much less expensive than drying them between carefully machined heated dies. However, free drying results in at least a small amount of warpage, and the final article has a somewhat fluffy and rough surface appearance. Such an article is often unacceptable to the trade because of the crude appearance and shape. This is particularly true if such an article is to be sold or used on the basis of its better appearance.

Among the objects of the present invention is the provision of improved drying or finishing methods for the treatment of molded pulp articles to give them the dimensional accuracy and/or degree of surface finish that is desired.

The above, as well as further objects of the invention, will be more readily understood from the following description of several of its exemplifications, reference being made to the accompanying drawings wherein:

Fig. 2 is a plan view, with parts in section, of the apparatus of Fig. 1;

Figure 1:
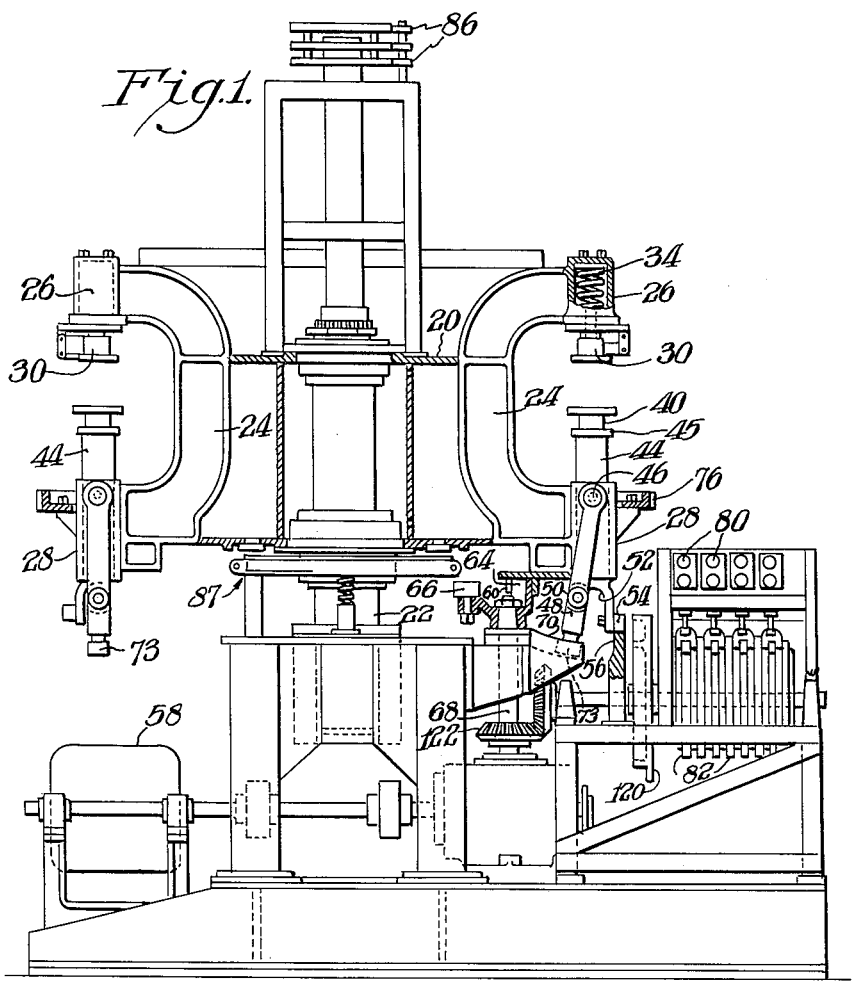
Fig. 1 is an elevation, with parts in section, of a drying and finishing apparatus suitable for use in the present invention.

Figs. 3 to 7, inclusive, are detail views illustrating a sequence of operational steps involved in the operation of the apparatus of Figs. 1 and 2; and Fig. 8 is an elevational view showing the transfer mechanism portion of the apparatus of Figs. 1 and 2.

According to a preferred embodiment of the present invention, wet molded articles are partially free-dried, and while they still contain an appreciable moisture content, are subjected to a drying and finishing operation between a set of complemental heated pressing dies. A suitable pressing apparatus for this purpose includes a series of mating pairs of complemental dies, one or both of which may be heated, the series being disposed in an endless or circular path, driving structure is connected to move the series around this path so that all the individual pairs of mating dies move successively through a predetermined position, operating mechanism is provided to move one of the dies of each pair away from and into face-to-face relation with respect to the other in a fixed transfer zone of the travel path, the other die of each pair being non-retractably, or substantially non-retractably mounted, said operating mechanism including loading elements interconnected for delivering an article to be dried and finished to one of the dies of each pair while these dies are held apart after which the dies are brought into face-to-face relation, pressing means is connected to press the dies of each pair together as they leave the transfer zone and to hold them together under heat and pressure through a pressing zone that occupies substantially the remainder of the travel path, said operating mechanism also including unloading structure connected for receiving a finished article from the open dies in the transfer zone to remove this article from the apparatus and make way for the next article to be finished. For maximum efficiency the transfer zone should extend over a minimum amount of the travel path along which the dies progress.

The individual sets of dies can be arranged either to move around the travel path in short steps or continuously without stopping except when the equipment is shut down. The molded pulp articles fed to the machine can have a moisture content varying from about 10% to 75% or more based on the total wet weight. After finishing in the above apparatus the moisture content is generally between about 5% and 8%. Where it is desired to obtain a particularly smooth and even glossy finish on the molded article, the moisture content should be preferably at least about 25% when it enters the machine. The lower initial moisture contents are very effectively used when the articles are to be given a lighter finishing treatment, as for example to iron out any warpage and restore the article to substantially its original molded shape with a minimum improvement of its surface appearance. Below 10% moisture, however, it becomes commercially impractical to effect much ironing or surface improvement without destroying many of the physical characteristics desired in the finished article.

The drying and finishing apparatus of Figs. 1 to 8, inclusive has a main table or framework 20 which is journalled on a vertical shaft 22 and carries a set of radially disposed die holders 24. Each die holder is generally C-shaped and includes an upper socket 26 and a lower guide 28 or tubular form vertically aligned with each other. The upper sockets 26 resiliently hold individual die carriers 30 to which upper dies 32 (Fig. 3) are securely fastened. In the form shown the resilient mounting is provided by coil springs 34 seated against the blind upper end of socket 26 and holding carrier 30 somewhat below the highest or fully seated position. The resilience not only acts as a control of the die clamping force but provides a margin of safety should two or more articles become accidentally loaded on a single die at the same time.

Vertically slidable in the lower guides 28 are elongated shanks 44 to which are fastened lower die carriers 40 carrying lower dies 42 (Fig. 3). The outer portions of each C-shaped holder 24 also carries, as by means of oppositely projecting horizontal pins 46, an opposed pair of pivoted compression links 48. Suitably disposed between each pair of links is a wedging roller 50 journalled about a horizontal axis and engageable with a cut-away wedge surface 52 at the lower portion of shank 44. The shanks also carry independent lifting rollers 54 which rest upon and cooperate with radially disposed fixed cam segments 56, 57 positioned for automatically raising and lowering the lifting rollers, respectively, at the proper times. A collar 45 on shank 44 acts as a lower limit stop for the opening movement of the lower dies.

In the above construction the framework 20 is rotated by means of electric motor 58 and an internal Geneva movement including a plurality of circular locking sectors 60 and bars 62 defining radial driving slots 63 fixed to the cage, along with a rotatable Geneva driver having a cooperating annular locking segment 64 concentric with segments 60, and driving roller 66 driven by shaft 68. The rotating drive is arranged so that there is one stepping position or circular sector 60 for each die holder 24 and with each revolution of shaft 68, the framework is stepped a distance which brings each holder 24 to the position previously occupied by an adjacent holder. In other words, the stepwise rotation carries each die holder through the same fixed and predetermined stopping positions between steps. For actuating the compression links 48, fixed cam operators 70, 72 are suitably supported to engage with a cam-following roller 73 fastened on each pair of the links. Cam 70 (Fig. 2) is positioned at the end of a pressing zone and has an inwardly offset portion 74 to effect unlocking of the pressing dies, while cam 72 is located at the beginning of the pressing zone and causes the dies to be locked in pressed engagement.

In the shorter or transfer zone between the cam operators 70, 72, the dies carried by the holders are arranged to be opened, unloaded, and have fresh articles supplied, for drying and finishing through the balance of the table rotation. To effect these transfers, a transfer unit 100, shown more clearly in Fig. 8, is mounted alongside the framework 20 in the transfer zone. Unit 100 includes a hollow shaft 102 journaled in fixed bearings 104 and carrying a drive gear 106 meshing with a peripheral ring gear 76 provided on framework 20. Vertically slidable within hollow shaft 102 and also rotatable along with this shaft, as by splined interconnection, is a post 108 which carries a pair of oppositely directed unloading dies 110, 111 and another pair of oppositely directed loading dies 112, 113 (Fig. 2). The lower end of post 108 is supported by a rocker lever 114 having a post-engaging block 116 and pivoted at 118 for actuation by a cam wheel 120. This cam wheel in turn is rotated by means of bevel gears 122 (Fig. 1) so as to be synchronized with the rotation of the main frame 20.

Below the outwardly projecting loading die 113 at position N (Fig. 2) there may be positioned a supply unit 200 for feeding individual molded articles to be pressed. Although the form of this unit is not critical to the present invention, U.S. Patent No. 2,752,830 describes a preferred embodiment thereof.

For simplifying the transfer of the articles being treated from one die to another, the dies may be perforated and fitted with suction and/or compressed air supplies. Control units 80 (Fig. 1) operated as by cams 82 driven in synchronism with the transfer unit 100 provide the desired timing of these transfer assisting features. Connections such as slip rings 86 are provided to conduct heating current to the pressing dies 32, 42 on the main frame 20. In addition a rotary valve assembly 87 can be arranged to establish vacuum and/or compressed air connections to these dies for operation at desired portions of the rotation cycle.

Referring more particularly to Fig. 2, as the frame 20 rotates, a pair of pressing dies is moved into position A while the loading transfer dies 112, 113 are rotated around to interchanged position and vertically reciprocated. At position A after the completion of the advancing step, the parts are then in the relationship shown in Fig. 3. During the vertical reciprocation one loading die 113 is brought against the top of the stacked plates in supply unit 200.

While this loading is taking place, the opposite loading die 112 is brought down against the open pressing die 42 just below it, as shown in Fig. 4 and deposits a previously loaded plate on this die. Suction can now be cut off from the loading die, applied to the pressing die and/or a puff of compressed air used to help this deposition.

The final lifting of the loading dies at the completion of the vertical oscillation returns the loading die 112 to the position shown at Fig. 3.

The next step in the rotation of frame 20 carries the open pressing dies with the transferred plate from position A to position B. Cam segment 56 here lifts the lower die 42 with its plate up against the upper die 32 as shown in Fig. 5. At the same time or shortly thereafter cam 72 carries the pressing link 48 outwardly to the positions shown consecutively in Figs. 5, 6 and 7. At the position of Fig. 6 the wedging roller 50 is brought into engagement with the wedge surface 52 and the upper die 32 has not yet been forcefully engaged so that it may still be suspended by its resilient mounting.

Continued movement of link 48 to the position of Fig. 7 causes the lower die to be wedged upwardly by roller 50, compressing the resilient support for the upper die and applying the desired pressing to the loaded plate.

At about this time heat may be applied to the dies, as by closing an electric circuit to electric heaters in both dies 32, 42. Alternatively the heating can be maintained uninterruptedly throughout the rotation of the main frame. From position B the closed dies are kept locked by the pressing links and are then stepped through positions C, D, E, F, G, H, J, K without interrupting the pressing. The locking of the compressing links can be secured by providing these links 48 with an over-center holding arrangement as by suitably shaping the wedging surface 52 in the manner shown in the figures.

Upon the movement of the dies through the steps L and M the links 48 are first unlocked by cam operator 70 and the lower die permitted to drop by the suitably shaped upper surface of cam segment 57. The dies accordingly open by retracing the sequence through the positions shown at Figs. 7, 6, 5 and 3. However, at position M, the open pressing dies have between them one of the unloading dies 110 instead of the loading die 112 shown in Fig. 3.

When the dies reach position M, or as they are about to move from there to position A, the vertical reciprocation of the transfer shaft 108 carries the unloading die 110 against the lower die 42 just beneath it as in Fig. 4, and with or without the assistance of suitably directed suction and/or compressed air, the plate that has been through the pressing cycle is transferred to this unloading die. Upon rotation of the transfer shaft 108 this unloading die is moved to position P (Fig. 2) where it then blows or permits the unloaded plate to drop onto a suitable discharge receptacle or conveyor, not shown.

This unloading sequence of the transfer mechanism, as described above, can be effected at the same time as the loading. In other words, each step of the transfer unit corresponding to a step of the main frame 20 can include a single vertical reciprocating step which simultaneously does the following operations:

(a) Transfers to unloading die at position M a plate that is carried by the pressing dies at this position.
(b) Transfers to the pressing dies a plate from a loading die at position A, which plate was previously picked up by this loading die at position N.
(c) Discharges from unloading die at position P a plate that it has previously received at position M.
(d) Transfers to a loading die at position N the top plate from the feed supply stack on supply unit 200.

It will thus be seen that the stepping of the pressing dies from position M to position A is accompanied by the unloading of the previously pressed plate and the loading of a fresh plate. From position A the dies then repeat the cycle described above so that the plates are continuously being loaded, pressed and discharged.

The pressing dies of the apparatuses of Figs. 1-8 are preferably heated to between about 250° and 450° F.

Lower die temperatures can also be used but require longer pressing treatments to effect the desired drying.

As many apparently widely different embodiments of the invention may be made without departing from the spirit and scope thereof, it is to be understood that the invention is not limited to the specific embodiments thereof except as limited by the appended claims. Thus the transfer device of the construction of Fig. 2 can be used to feed to and unload articles from other article handling devices such as printers, labellers, etc.

This application is a divisional application of application Serial No. 251,411 of October 15, 1951, now U.S. Patent No. 2,752,830 of July 3, 1956.

What is claimed is:

1. In a method of molding pulp articles, including the steps of immersing into a liquid pulp slurry a foraminous mold under suction to deposit a layer of wet pulp thereon which initially forms a molded pulp article, and removing the mold from the slurry; the improvements which comprise free drying the wet pulp article without compression to effect only partial removal of the moisture therein while retaining sufficient moisture in the article to permit substantial smoothing of the surfaces thereof upon the application of heat and pressure, and then subjecting the partially dried article to compression between heated dies to remove the remaining moisture and impart a smooth surface finish to the article.

2. A method of finishing wet molded pulp articles, which method comprises free drying the wet molded articles to a moisture content of about 25 to about 75% based on the total wet weight, and completing the drying by pressing between heated dies having pressing surfaces shaped to provide the desired finish.

3. A method of finishing wet molded pulp articles, which method comprises free drying the wet molded articles to a moisture content of about 10% to 75% based on the total wet weight, and completing the drying by pressing between heated dies having pressing surfaces shaped to provide the desired finish.

4. In a method of molding pulp articles, including the steps of immersing into a liquid pulp slurry a foraminous mold under suction to deposit a layer of wet pulp thereon which initially forms a molded pulp article, and removing the mold from the slurry; the improvements which comprise free drying the wet pulp article without compression to a moisture content of about 10 to about 75% based on the total wet weight and then subjecting the partially dried article to compression between heated dies to remove the remaining moisture and impart a smooth surface finish to the article.

5. The method of claim 4 wherein the wet pulp article is free dried without compression to a moisture content of about 25 to about 75% based on the total wet weight.

6. A method for pressing partially free-dried molded pulp articles containing a moisture content from about 10 to 75% based on their total wet weight, said method including the steps of continuously moving a series of pressing die sets along a predetermined feed path, each set comprising a pair of complementary dies and said dies being maintained in spaced, open relation to each other during their movement along said feed path, supplying individual articles to be molded and sliding them successively to the dies as they move in open relation, closing the moving dies on the successively fed articles, to press them for the desired time, opening the moving dies after the pressing, and individually removing the pressed articles from the open dies while maintaining the movement of said dies.

References Cited in the file of this patent

UNITED STATES PATENTS

| | | |
|---|---|---|
| 759,616 | Keyes | May 10, 1904 |
| 1,618,289 | Koppelman | Feb. 22, 1927 |
| 2,046,750 | Mason et al. | July 7, 1936 |
| 2,080,077 | Howard et al. | May 11, 1937 |
| 2,234,979 | Randall et al. | Mar. 18, 1941 |
| 2,309,206 | Newman | Jan. 26, 1943 |
| 2,369,488 | Perry | Feb. 13, 1945 |
| 2,388,828 | Chaplin | Nov. 13, 1945 |
| 2,704,493 | Randall | Mar. 22, 1955 |